Figure 1:
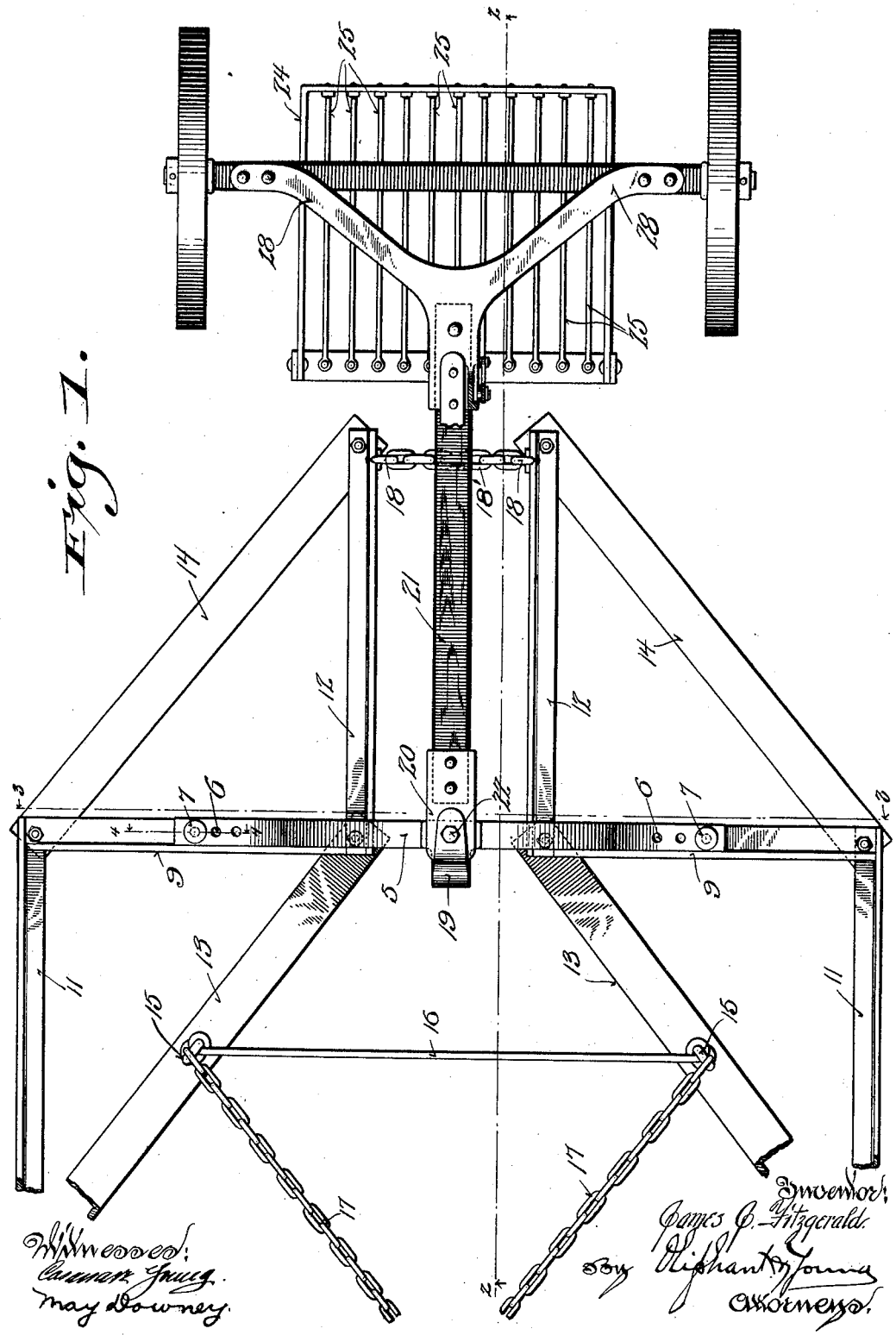

J. J. FITZGERALD.
ROAD DRAG.
APPLICATION FILED NOV. 2, 1911.

1,100,821.

Patented June 23, 1914.
2 SHEETS—SHEET 1.

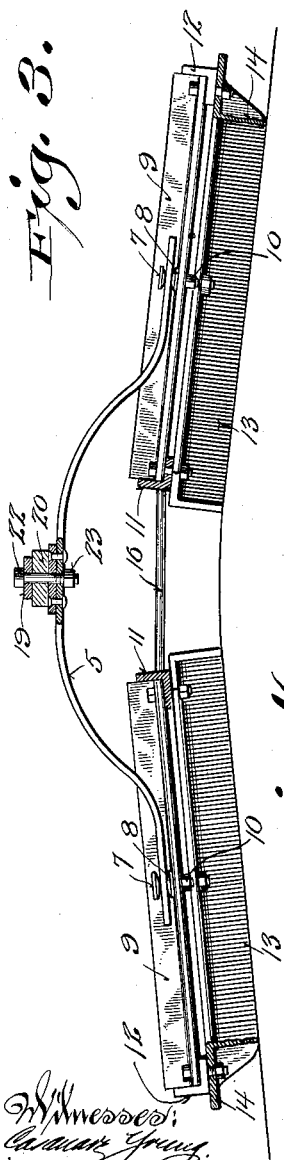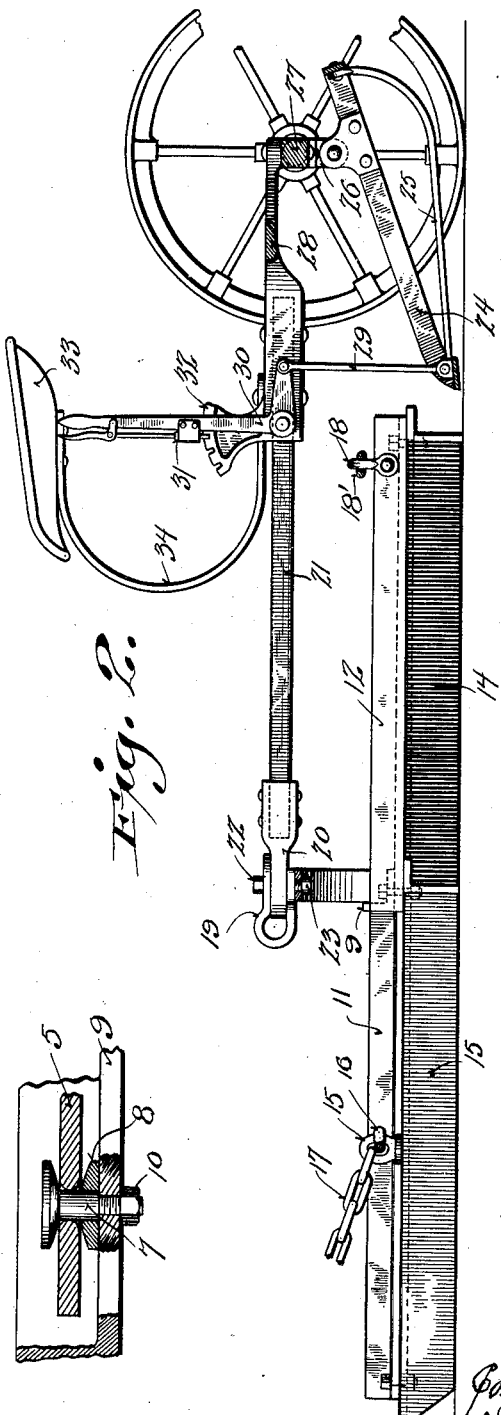

UNITED STATES PATENT OFFICE.

JAMES J. FITZGERALD, OF EAGLE, WISCONSIN.

ROAD-DRAG.

1,100,821.  Specification of Letters Patent.  Patented June 23, 1914.

Application filed November 2, 1911. Serial No. 658,147.

*To all whom it may concern:*

Be it known that I, JAMES J. FITZGERALD, a citizen of the United States, and resident of Eagle, in the county of Waukesha and State of Wisconsin, have invented certain new and useful Improvements in Road-Drags; and I do hereby declare that the following is a full, clear, and exact description thereof.

My invention consists in what is herein particularly set forth with reference to the accompanying drawings and pointed out in the claim of this specification, its object being to provide simple, economical, strong, durable and efficient drags for smoothing roads, each drag being automatically conformable to opposing surface contour and adapted for connection with a screening-cart in which to gather large stones and refuse material.

Figure 1 of the drawings represents a plan view of one of my improved drags and screening-cart attachment partly broken away; Fig. 2, a longitudinal sectional view of the same on the plane indicated by line 2—2 in Fig. 1; Fig. 3, a transverse sectional view of the drag on the plane indicated by line 3—3 in said Fig. 1, and Fig. 4, a similar view of a fragment of said drag on the plane indicated by line 4—4 in the aforesaid Fig. 1.

Referring by numerals to the drawings 5 indicates a suspension arch for a pair of drag-frames, and each of these frames is in the form of a parallelogram. Each end of the arch is laterally extended and provided with a series of alined eyes 6, any one of which is for the engagement of a pivot-bolt 7 that extends therefrom through a washer 8 and a central cross-brace 9 of the adjacent drag-frame to be engaged with a nut 10. The underside of the bolt-head, the upper side of the washer and the edge of each eye of the arch 5 are rounding to provide for swivel play of the drag-frame, and the pivot-bolt is shouldered in opposition to the cross-brace of said frame to prevent binding draw of the nut on said bolt, as is clearly illustrated in Fig. 4. The cross-brace and other members of each drag-frame are preferably of L-shaped angle-steel suitably disposed and bolted one to another at the corners of said frame. The cross-brace 9 of each drag-frame is laid in upon the horizontal portions of forwardly and rearwardly extending frame-members 11, 12 to abut the vertical portions of the same, and said frame members 11, 12 are laid on the horizontal portions of the parallel working-frame-members 13, 14 to which and said cross-brace they are bolted. Said frame-members 13 and 14 are oblique to a line of draft, the obliquity of those in one frame being opposite that of those in the other frame. The forwardly diverging scraping-members 13 of the pair of drag-frames are provided with eye-bolts 15 with which the ends of a stay-rod 16 have free play connection, and forwardly converging draft-chains 17 are also connected to said eye-bolts. The rearwardly extending parallel members 12 of the paired drag-frames are provided with hooks 18 for the engagement of a connecting rod or chain 18'.

In rigid connection with the arch 5, central of the same, is a clevis 19 with which to detachably connect the eye extremity of a shackle 20 fast on the forward end of the tongue 21 of the screening-cart to which reference is had in the foregoing, the clevis-pin being preferably a bolt 22 engaging a nut 23. The cart-body is a screen consisting of a strap-iron or steel frame 24, and a series of rods 25 suitably spaced in connection with said frame. The sides of the screen-frame are in pivotal connection with hangers 26, attached to the underside of the cart-axle 27, and coupled hounds 28 are shown in rigid connection with said axle and cart-tongue.

The front of the screen-frame is connected by a link-rod 29 with a bell-crank 30 for which a side of the tongue-end of the hounds is provided with a fulcrum, and a latch 31 in connection with the lever in engageable with a quadrant rack 32 to hold the screen in pivotally adjusted position. A driver's-seat 33 is shown fast on a spring-support 34 fastened on the tongue-end of the aforesaid hounds.

From the foregoing it will be readily understood that the drag frames have free pivotal play when in connection with the suspending arch, and thus provision is had for a yield and tilt of said frames to clear such obstructions in their paths that cannot be dragged out of place. The drag-frames are adjustable longitudinally of the suspension arch as herein shown, but this arch may be omitted and normal distance apart of said frames regulated by the length of the stay-rod in connection therewith.

The stones and refuse material, in the path of the scraping members of the drag-frames, are gathered in a ridge between said frame, and if the cart herein specified is employed, the body thereof is lowered to screen the constituents of the ridge and collect such of such constituents that are too bulky to be left on the dragged surface.

I claim:

In a drag, the combination of a pair of parallelogram frames each having a central cross-brace member and a pair of scraping-members oblique to a line of draft, the obliquity of those in one frame being opposite those in the other frame; a stay-rod connected at its ends to the forward scraping-members of the frames, means loosely connecting the rearwardly extending parallel inner side members of the frames, a suspension arch in swivel-connection at its ends with the central cross-brace members of the frames, a clevis in connection with the arch central of the same for the attachment thereto of the draft tongue of a follower of the drag, and outwardly converging draft devices in connection with the forward scraping-members of the frame.

In testimony that I claim the foregoing I have hereunto set my hand at Milwaukee, in the county of Milwaukee and State of Wisconsin in the presence of two witnesses.

JAMES J. FITZGERALD.

Witnesses:
GEO. W. YOUNG,
CASANAVE YOUNG.

Copies of this patent may be obtained for five cents each, by addressing the "Commissioner of Patents, Washington, D. C."